United States Patent [19]

Lo

[11] Patent Number: 5,100,162
[45] Date of Patent: Mar. 31, 1992

[54] CONNECTOR FOR CHAIN STAY AND SEAT STAY

[76] Inventor: Kun-Nan Lo, No. 33, Hsiang-Ho Rd., Li-Lin Tsun, Tan-Tsu Hsiang, Taichung Hsien, Taiwan

[21] Appl. No.: 597,311

[22] Filed: Oct. 15, 1990

[51] Int. Cl.[5] .................. B62K 19/22; B62K 19/28; B62K 19/16
[52] U.S. Cl. .................. 280/281.1; 403/298; 264/257; 156/293
[58] Field of Search .............. 280/274, 281.1, 284, 280/288; 403/298; 264/257; 156/293, 294

[56] References Cited

U.S. PATENT DOCUMENTS

| | | | |
|---|---|---|---|
| 4,605,466 | 8/1986 | Eisenzimmer | 156/293 |
| 4,834,127 | 5/1989 | Van Sice | 403/298 X |
| 4,856,800 | 8/1989 | Hashimoto et al. | 280/281.1 |
| 4,856,802 | 8/1989 | Schilplin | 280/288 |
| 4,900,048 | 2/1990 | Derujinsky | 280/281.1 |
| 4,902,160 | 2/1990 | Jeng | 280/281.1 X |
| 5,052,848 | 10/1991 | Nakamura | 280/281.1 X |

FOREIGN PATENT DOCUMENTS 2549795  2/1985  France ..................... 280/281.1

Primary Examiner—Charles A. Marmor
Assistant Examiner—Kevin Hurley
Attorney, Agent, or Firm—Cushman, Darby & Cushman

[57] ABSTRACT

A connector includes a pawl-like metal piece to be engaged with the axle or a rear wheel of a bicycle. The metal piece has two protrusions to be inserted in and connected to the joint ends of a plastic chain stay and a plastic seat stay, and a resin coated fabric material wrapped around each protrusion and each joint end. Spaced annular ridges are provided on the protrusions to engage with the resin coated fabric material. The fabric material is cohesively bonded to the corresponding plastic joint after application of heat.

3 Claims, 5 Drawing Sheets

CONNECTOR FOR CHAIN STAY AND SEAT STAY

BACKGROUND OF THE INVENTION

1. Field of The Invention

This invention relates to a connector to join a plastic chain stay and a plastic seat stay to the rear wheel of a bicycle, and particularly to a connector having a pawl-like metal piece attached to the axle of the rear wheel and having two protrusions to be inserted into hollow joint ends of the seat stay and the chain stay.

2. Description of The Related Prior Art

Conventionally, most bicycles employ a metallic chain stay and a metallic seat stay both of which are attached to the axle of the rear wheel by a common pawl-like metal member 1 shown in FIG. 1. The pawl-like metal member 1 has an engaging notch 2 engaged with the axle of the rear wheel and two connecting portions 3 respectively connected to the joint ends of the seat stay and the chain stay by screw-connection, welding, or other suitable connecting means. Recently, there are some bicycles with composite plastic chain stays and seat stays which help reduce the weight of the bicycle, an advantageous effect. These plastic chain stays and seat stays are also connected to the axle of the rear wheel through a pawl-like metal piece. Generally, adhesive is employed to bond the pawl-like metal piece to the plastic chain and seat stays. However, adhesive-bonding is insufficient to prevent separation of the stays from the metal piece. In addition, since the plastic stays are of less hardness and strength than the metal piece, it is inevitable that the joint ends of he stays wear out easily as a result of the stress induced thereat.

SUMMARY OF THE INVENTION

An object of the invention is to provide an improved connector to securely join a plastic chain stay and a plastic seat stay to the axle of a rear wheel, which connector alleviates the problem of rapid wear of the joint ends of the stays.

According to the present invention, a device for connecting a joint end of a plastic chain stay tube and a joint end of a plastic seat stay tube to an axle of a rear wheel of a bicycle, comprises a pawl-like metal piece having an engaging notch to be engaged with and connected to the axle and two protrusions to be inserted in and connected to the joint ends of the plastic chain stay tube and the plastic seat stay tube. A resin coated fabric material is wrapped around each protrusion between each protrusion and each joint end. Each protrusion has spaced annular ridges to engage the fabric material. The fabric material is cohesively bonded to the joint ends of the stays after application of heat.

The exemplary preferred embodiment will be described in detail with reference to the accompanying drawings, in which:

DETAILED DESCRIPTION OF THE PREFERRED EMBODIMENT

Figure 1:
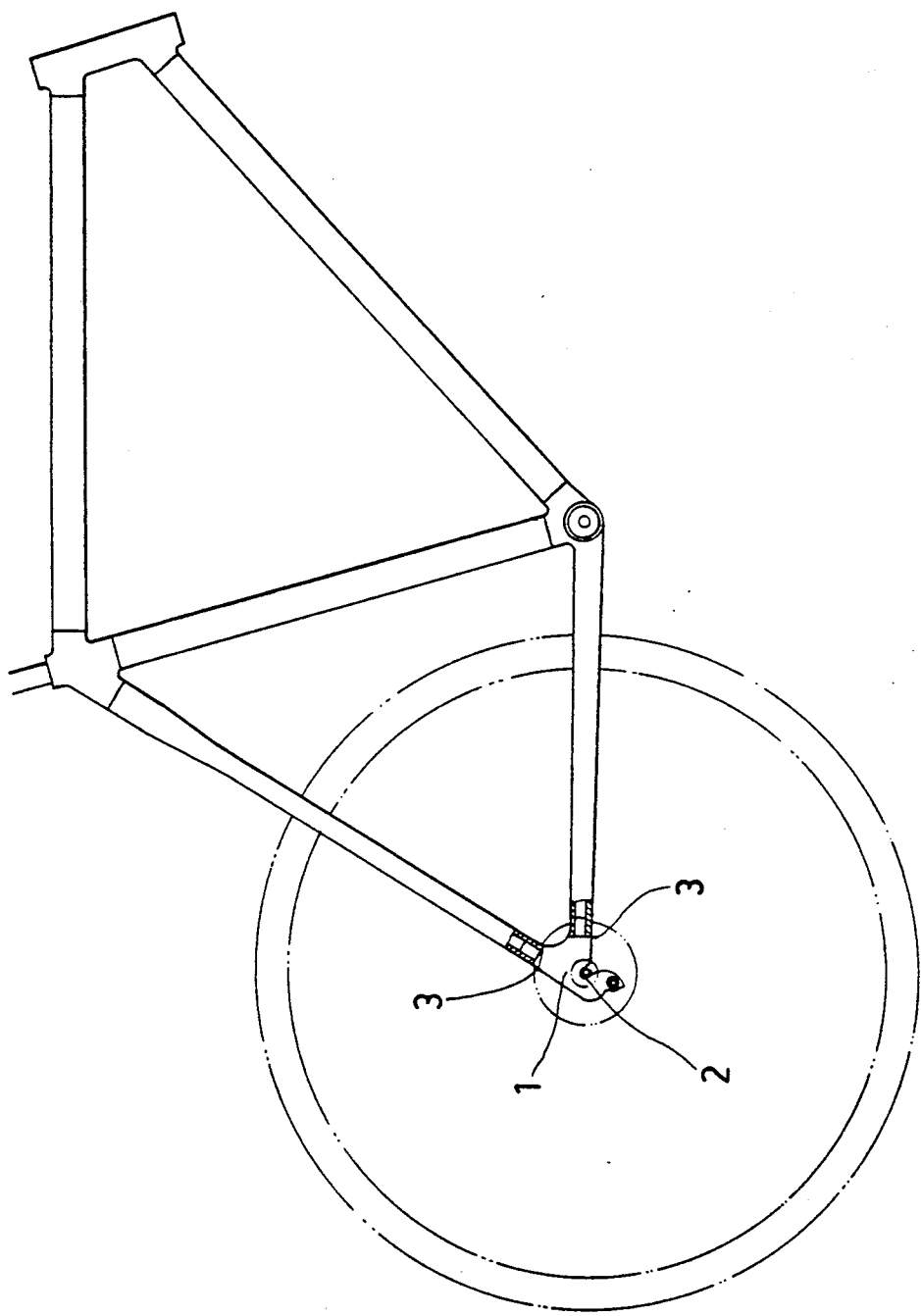
FIG. 1 is a schematic plan view of a connector for a chain stay and a seat stay in the prior art.
Figure 2:
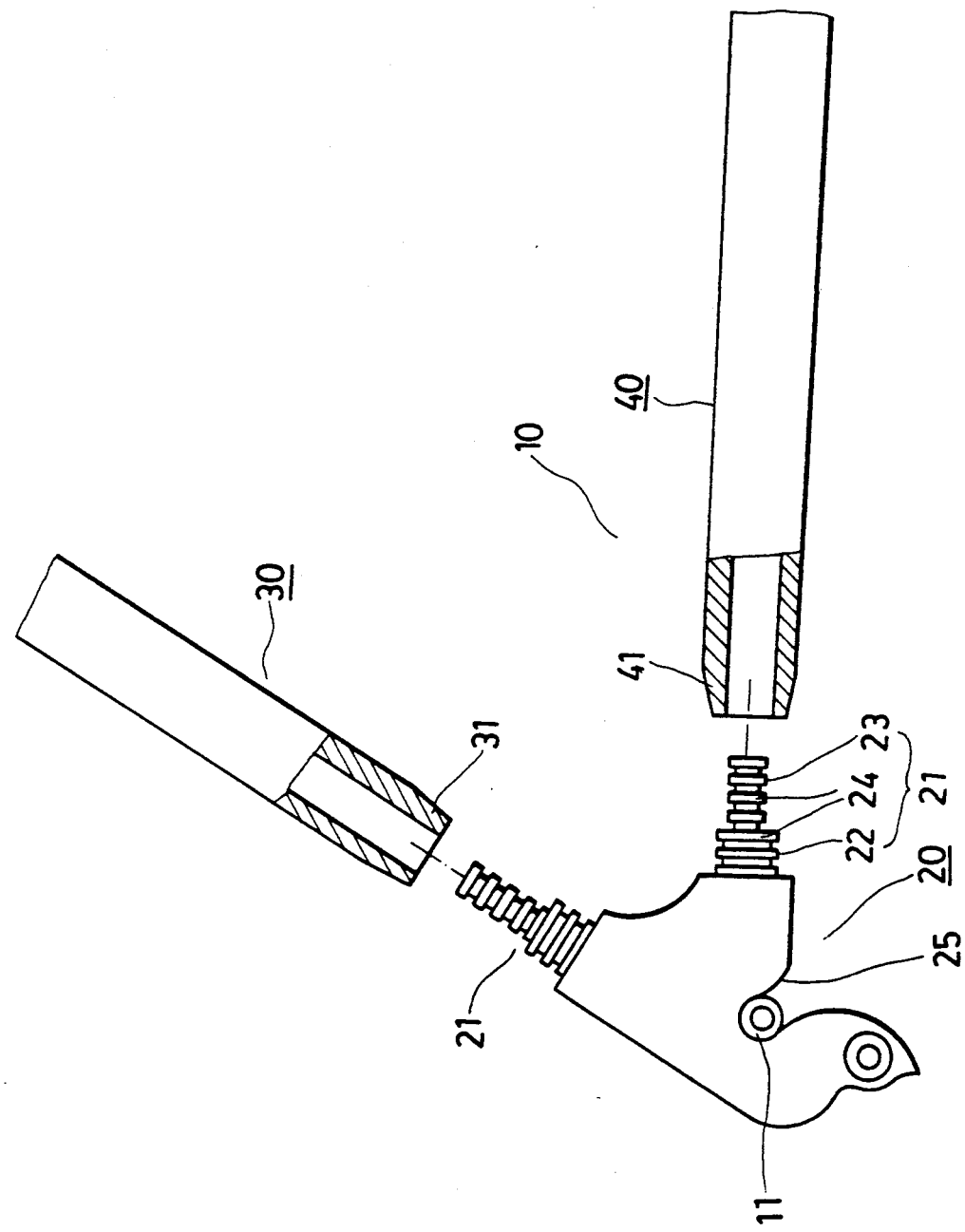
FIG. 2 is an exploded view of a connector embodying the present invention, in which the resin coated fabric material is omitted.
Figure 4:
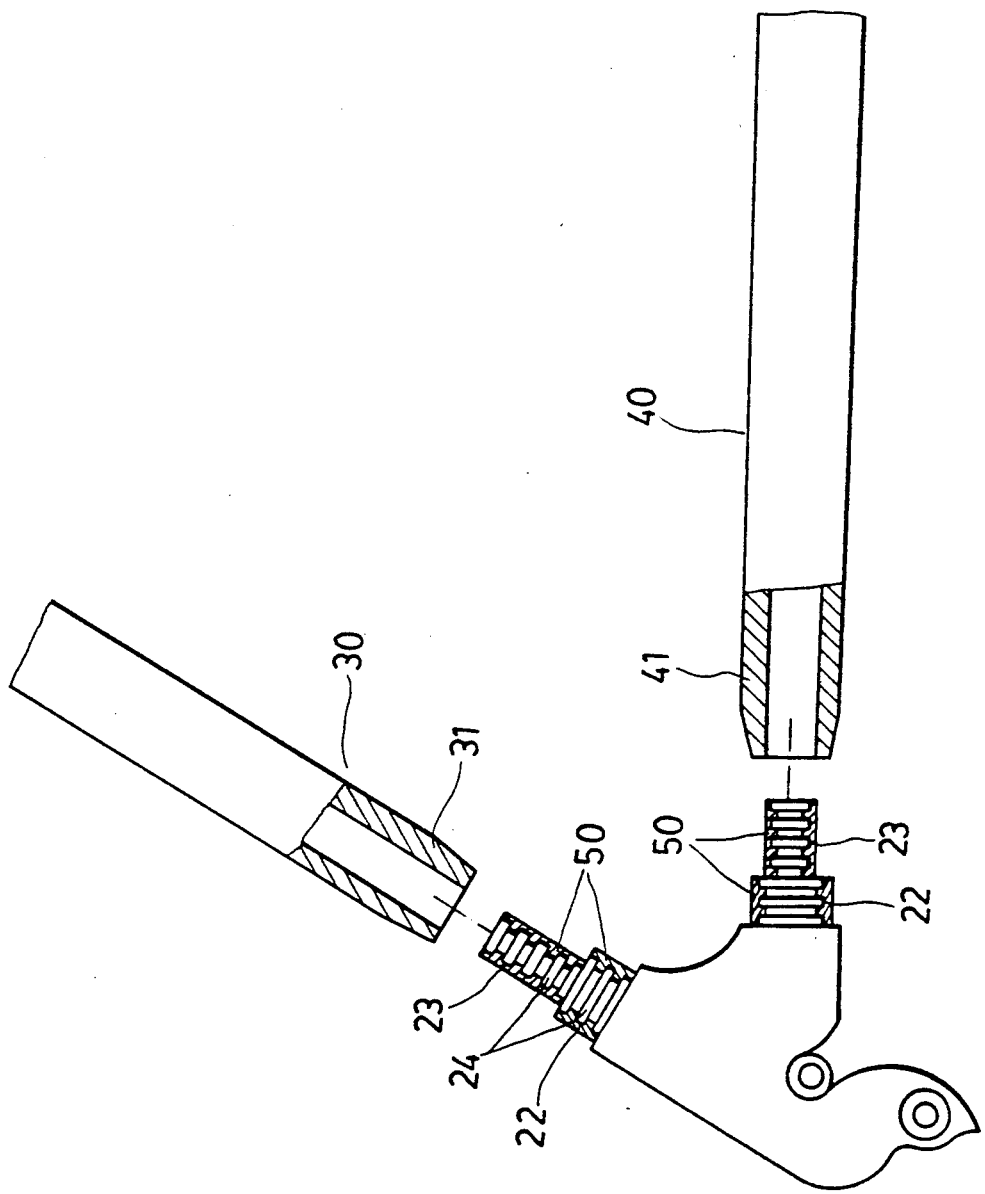
FIG. 4 is an exploded view of the connector of FIG. 2 with the resin coated fabric material.
Figure 5:
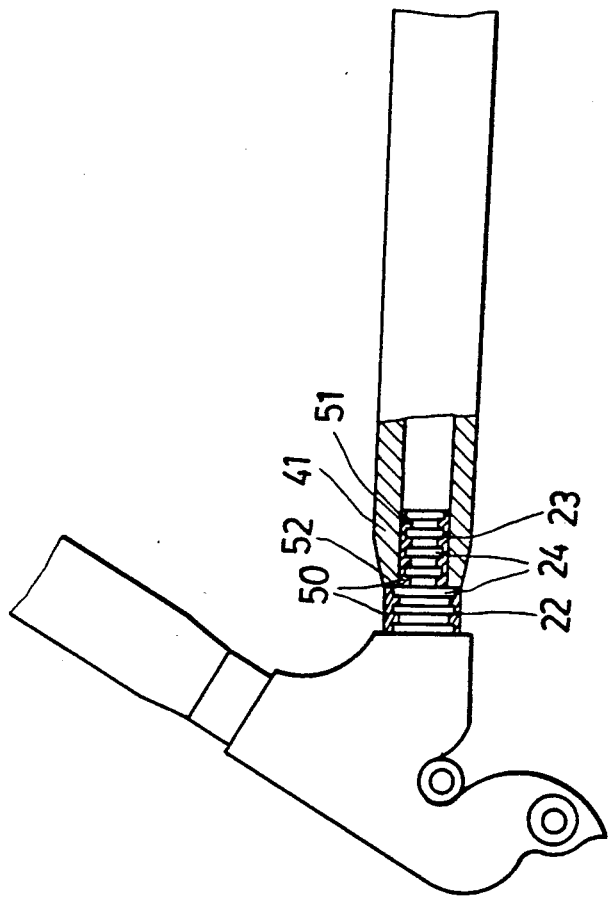
FIG. 5 is a view showing a complete connection between the chain stay and the seat stay.

Referring to FIGS. 2, 4 and 5, a connector embodying the present invention includes a pawl-like metal piece 20 to be attached to an axle of a rear wheel of a bicycle. The pawl-like piece 20 has an engaging notch 25 to engage with the axle 11 of the rear wheel (not shown), and two protrusions 21 to be respectively joined with a seat stay 30 and a chain stay 40.

Figure 3:
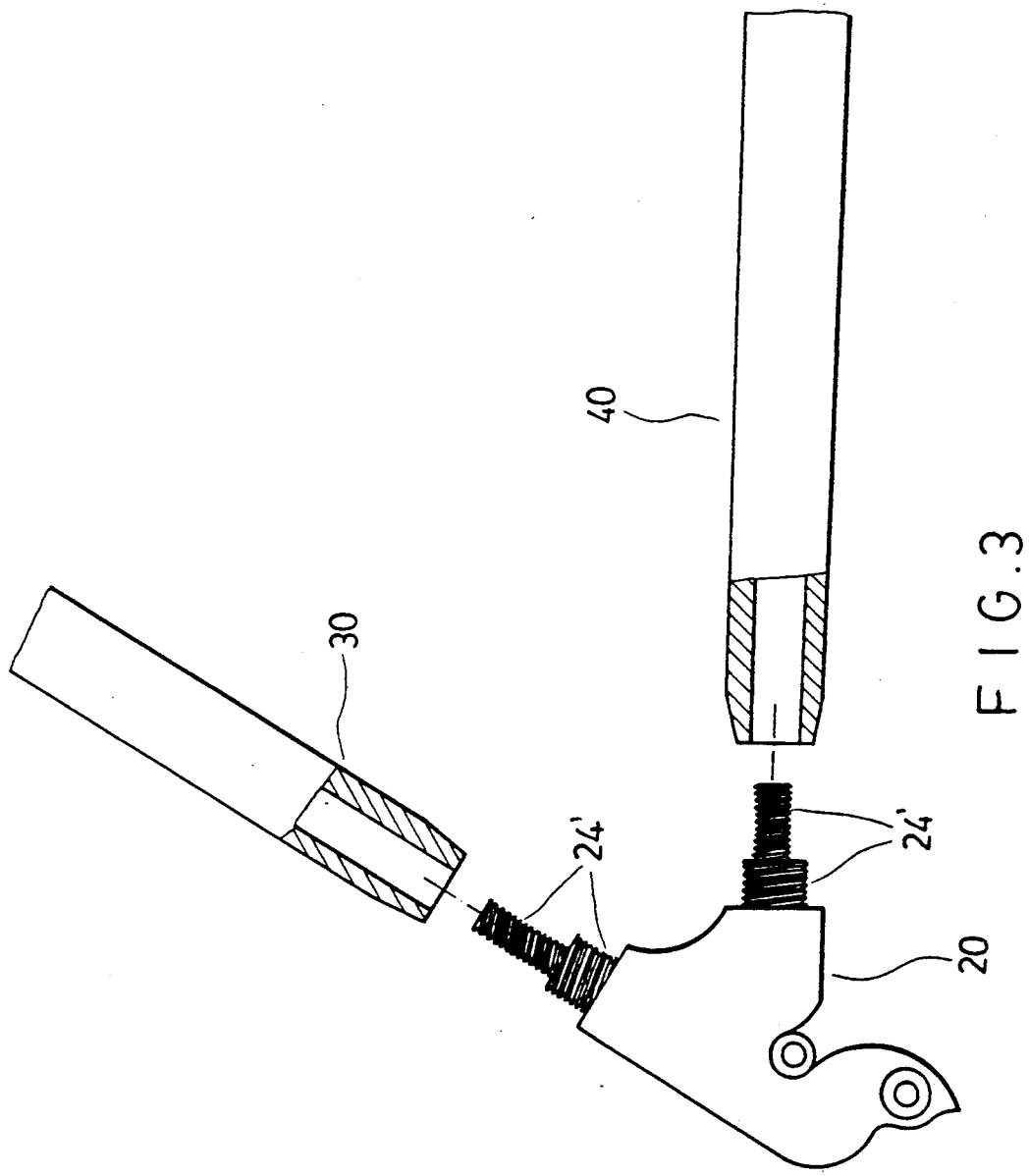
FIG. 3 is an exploded view of an alternative connector embodying the present invention, in which the resin coated fabric material is omitted.

Each protrusion 21 has two sections 22, 23 of different cross-sections and a plurality of annular engaging ridges 24 in both sections 22 and 23. Alternatively, the annular engaging ridges 24 can be replaced by screw threads 24' shown in FIG. 3. The joint ends 31 and 41 of the seat stay 30 and the chain stay 40 are hollow and slightly tapered. Each hollow joint end 31 or 41 is sleeved around its corresponding protrusion 21.

A resin coated fabric material 50 is wrapped around each protrusion 21 and fitted in each hollow joint end 31 or 41. Preferably, the resin coated fabric material 50 is comprised of epoxy resin impregnated woven carbon fibers. When the joint so assembled is heat and pressurized by using a die, the resin coated material 50 is cured and cohesively bonded to the joint ends of the seat stay and the chain stay. FIG. 5 shows the finished joints of the pawl-like metal piece 20 with the ends of the seat stay tube 30 and the chain stay tube 40. The end of the seat stay tube 30 or the chain stay tube 40 is abutted against the shoulder 52 of each protrusion 21. The resin coated fabric material 50 engages the ridges of the protrusion 21 of the pawl-like metal piece and bonded cohesively to the plastic joint end of the seat stay or the chain stay, thereby firmly connecting each stay to the pawl-like metal piece.

With the invention thus explained, it is apparent that numerous variations and modifications can be made without departing from the scope of the invention. It is therefore intended that the invention be limited only as indicated in the appended claims.

I claim:

1. A device for connecting a joint end of a plastic chain stay tube and a joint end of a plastic seat stay tube to an axle of a rear wheel of a bicycle, said device comprising:

a pawl-like metal piece, shaped so as to have (a) an engaging notch to be engaged with and connected to said axle (b) a first protrusion adapted to be inserted into and connected to said plastic chain stay tube joint end and (c) a second protrusion adapted to be inserted into and connected to said plastic seat stay tube joint end, each of said protrusions have spaced annular engaging ridges, and a resin coated fabric material wrapped around each of said protrusions between each of said protrusions and each of said joint ends, said resin coated fabric material being cohesively bonded to said joint ends after application of heat so that when assembled, there will be resin coated fabric material within the joint end of the chain stay tube and within the joint end of the seat stay tube.

2. A device as claimed in claim 1, wherein said annular engaging ridges are in the form of screw threads.

3. A device as claimed in claim 1, wherein each of said protrusions is stepped to have a first section of large cross-section and a second section of small cross-section.

* * * * *